United States Patent
Naguib et al.

(10) Patent No.: US 11,558,071 B2
(45) Date of Patent: *Jan. 17, 2023

(54) WIRELESS RANGING USING PHYSICAL AND VIRTUAL RESPONDERS

(71) Applicant: Apple Inc., Cupertino, CA (US)

(72) Inventors: Ayman F. Naguib, Cupertino, CA (US); Arun Yadav, Cupertino, CA (US); Robert Golshan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/371,225

(22) Filed: Jul. 9, 2021

(65) Prior Publication Data

US 2021/0344362 A1 Nov. 4, 2021

Related U.S. Application Data

(63) Continuation of application No. 16/831,912, filed on Mar. 27, 2020, now Pat. No. 11,095,319.

(60) Provisional application No. 62/878,967, filed on Jul. 26, 2019.

(51) Int. Cl.
*H04B 1/38* (2015.01)
*H04B 1/00* (2006.01)

(52) U.S. Cl.
CPC ............. *H04B 1/0053* (2013.01); *H04B 1/38* (2013.01)

(58) Field of Classification Search
CPC ......... H04B 1/0053; H04B 1/38; G01S 5/021; G01S 5/0215; G01S 5/0218; G01S 13/762; G01S 11/02; G01S 13/765; G01S 13/767; G01S 13/876; G01S 13/88
See application file for complete search history.

(56) References Cited

U.S. PATENT DOCUMENTS

| | | |
|---|---|---|
| 6,366,240 B1 | 4/2002 | Timothy et al. |
| 7,358,893 B2 | 4/2008 | O'Brien |
| 9,891,312 B2 | 2/2018 | Lee et al. |

(Continued)

OTHER PUBLICATIONS

Extended European Search Report for Patent Application No. EP20184332, dated Oct. 30, 2020, 8 pages.

*Primary Examiner* — Kenneth T Lam
(74) *Attorney, Agent, or Firm* — Kowert, Hood, Munyon, Rankin & Goetzel, P.C.

(57) ABSTRACT

An electronic device configures two or more virtual responders associated with different subsets of capabilities of a physical responder in the electronic device, where the physical responder comprises a radio-frequency (RF) transceiver and multiple antennas, and where a given virtual responder corresponds to the RF transceiver and a given antenna. Then, the electronic device performs, based at least in part on wirelessly communication with a second electronic device and using at least the virtual responders, measurements on wireless signals from the second electronic device to the electronic device, where the measurements correspond to a time of flight of the wireless signals. Next, the electronic device determines, based at least in part on the measurements, a range between the electronic device and the second electronic device, where the determination uses the measurements from different virtual responders to correct for an environmental condition and/or increase an accuracy of the determined range.

20 Claims, 6 Drawing Sheets

(56) References Cited

U.S. PATENT DOCUMENTS

| | | | |
|---|---|---|---|
| 10,177,797 B2 | 1/2019 | Nallampatti Ekambaram et al. | |
| 11,095,319 B2* | 8/2021 | Naguib | H04B 1/38 |
| 2014/0204793 A1* | 7/2014 | Ben-Haim | H04L 7/0033 |
| | | | 370/253 |
| 2015/0045055 A1 | 2/2015 | Prechner et al. | |
| 2015/0099538 A1* | 4/2015 | Wang | G01S 5/00 |
| | | | 455/456.1 |
| 2016/0363659 A1* | 12/2016 | Mindell | G01S 13/74 |
| 2016/0366548 A1* | 12/2016 | Wang | H04W 64/00 |
| 2017/0187830 A1 | 6/2017 | Eyal | |
| 2017/0188301 A1* | 6/2017 | Eyal | H04W 4/02 |
| 2017/0357788 A1* | 12/2017 | Ledvina | G06F 21/88 |
| 2018/0041990 A1* | 2/2018 | Venkatesan | H04B 7/0452 |
| 2018/0292518 A1* | 10/2018 | Chu | H04W 72/121 |
| 2018/0310133 A1* | 10/2018 | Ramasamy | G01S 19/48 |
| 2019/0135229 A1* | 5/2019 | Ledvina | H04W 64/00 |
| 2019/0306825 A1* | 10/2019 | Lindskog | H04L 27/2657 |
| 2020/0120509 A1* | 4/2020 | Stitt | H04W 12/122 |
| 2020/0182996 A1* | 6/2020 | Lee | G01S 13/785 |

\* cited by examiner

WIRELESS RANGING USING PHYSICAL AND VIRTUAL RESPONDERS

CROSS-REFERENCE TO RELATED APPLICATION

This application is a continuation of U.S. Non-Provisional application Ser. No. 16/831,912, entitled "Wireless Ranging Using Physical and Virtual Responders," by Ayman F. Naguib, et al., filed Mar. 27, 2020, and claims the benefit of U.S. Provisional Application No. 62/878,967, entitled "Wireless Ranging Using Physical and Virtual Responders," by Ayman F. Naguib, et al., filed Jul. 26, 2019, the contents of both of which are hereby incorporated by reference.

FIELD

The described embodiments relate, generally, to communication of wireless signals by an electronic device, including techniques for estimating a range between electronic devices using physical and virtual responders.

BACKGROUND

Many electronic devices communicate with each other using wireless communication. For example, the communication between electronic devices may be based on a communication protocol that is compatible with an Institute of Electrical and Electronics Engineers (IEEE) standard, such as an IEEE 802.11 standard (which is sometimes referred to as 'Wi-Fi'), a cellular telephone communications standard, a Global Positioning System, etc.

In principle, wireless signals can be used to determine distance between electronic devices. Notably, using the time of flight of electromagnetic signals and the speed of light, the range between electronic devices can be determined. Because of the pervasiveness of wireless communication, this capability can enable a wide variety of applications.

However, in practice, it can be difficult to accurately estimate the range. For example, the accuracy of the determined range can be degraded by environmental effects, such as interference sources and/or multipath signals. The resulting reduced accuracy of the estimated range is often an obstacle to the use of wireless ranging in many applications.

SUMMARY

An electronic device that determines a range is described. This electronic device may include: a physical responder with a radio-frequency (RF) transceiver and multiple antennas; and an integrated circuit (such as a processor). During operation of the electronic device, the integrated circuit configures two or more virtual responders associated with different subsets of capabilities of the physical responder, where a given virtual responder corresponds to the RF transceiver and a given antenna in the multiple antennas. Then, based at least in part on wirelessly communication with a second electronic device, at least the virtual responders perform measurements on wireless signals associated with the second electronic device and intended for the electronic device (e.g., the wireless signals from the second electronic device to the electronic device, which may or may not be addressed to the electronic device), where the measurements correspond to a time of flight of the wireless signals. Next, based at least in part on the measurements, the integrated circuit determines the range between the electronic device and the second electronic device, where the determination uses the measurements from different virtual responders to correct for an environmental condition and/or increase an accuracy of the determined range. In some implementations, any combination of one or more physical responders and one or more virtual (or virtualized) responders can be used.

Moreover, when the determined range is within a threshold distance, the integrated circuit may perform an action. For example, the integrated circuit may: unlock the electronic device (or enable access to the electronic device or a feature/function thereof), transition the electronic device from a first power state to a second power state (such as from a low power state to a higher power state), change a state of the electronic device (such as unlocking or opening a portal or door that is proximate or adjacent to the second electronic device) or identify the second electronic device.

Note that at least the virtual responders may perform the measurements at different spatial locations on the electronic device and/or at different times at a same location on the electronic device (such as using the same antenna in the multiple antennas). Thus, the measurements may use spatial and/or temporal diversity.

Furthermore, the measurements may also be performed by the physical responder.

Additionally, the electronic device may include at least a second physical responder with a second RF transceiver and multiple second antennas, and the integrated circuit may configure two or more second virtual responders associated with different subsets of capabilities of the second physical responder. In these embodiments, the measurements may be performed by the physical responder, the second physical responder, the virtual responders and/or the second virtual responders.

In some embodiments, the integrated circuit dynamically configures the virtual responders.

Note that the environmental condition may include interference and/or a multipath signal.

Moreover, the electronic device may include a vehicle, a door, a computer, etc.

Furthermore, the wireless communication may include or may use ultra-wideband (UWB). For example, the wireless communication may be compatible with an IEEE 802.15 standard.

Additionally, the second electronic device may be a cellular telephone (e.g., smartphone), a portable computing device, a wearable device, etc.

In some embodiments, the range is determined (or estimated) based at least in part in a second time of flight of second wireless signals associated with the electronic device and intended for the second electronic device (e.g., the second wireless signals from the electronic device to the second electronic device).

Other embodiments provide the RF transceiver, the physical responder and/or the integrated circuit.

Other embodiments provide a computer-readable storage medium for use with the electronic device. When program instructions stored in the computer-readable storage medium are executed by the electronic device, the program instructions may cause the electronic device to perform at least some of the aforementioned operations of the electronic device.

Other embodiments provide a method for determining a range. The method includes at least some of the aforementioned operations performed by the electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1A:
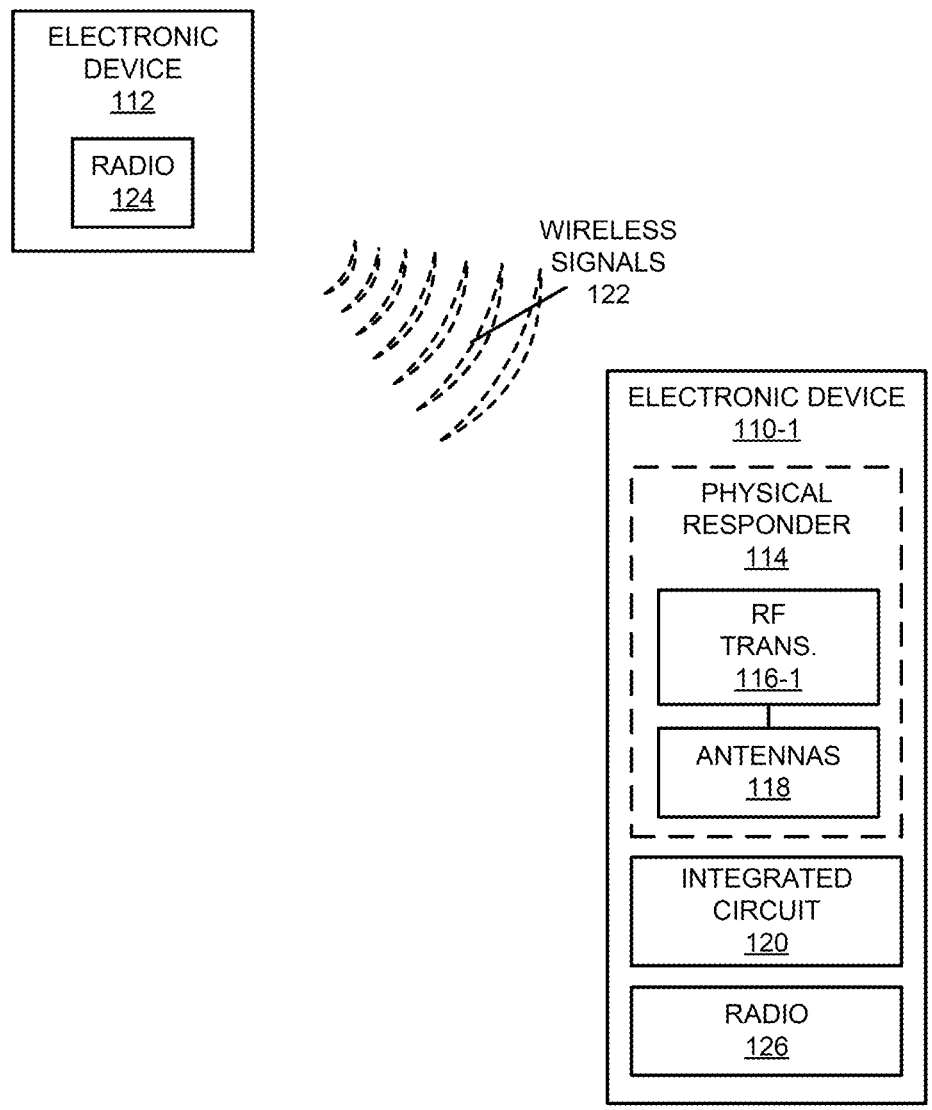
FIG. 1A is a block diagram illustrating an example of communication between electronic devices.

An electronic device that determines a range is described. During operation, the electronic device configures two or more virtual responders associated with different subsets of capabilities of a physical responder in the electronic device, where the physical responder comprises an RF transceiver and multiple antennas, and where a given virtual responder corresponds to the RF transceiver and a given antenna in the multiple antennas. Then, the electronic device performs, based at least in part on wirelessly communication with a second electronic device and using at least the virtual responders, measurements on wireless signals from the second electronic device to the electronic device, where the measurements correspond to a time of flight of the wireless signals. Next, the electronic device determines, based at least in part on the measurements, a range between the electronic device and the second electronic device, where the determination uses the measurements from different virtual responders to correct for an environmental condition and/or increase an accuracy of the determined range.

By correcting for the environmental condition (such as interference or a multipath signal) and/or increasing the accuracy of the determined range, these measurement techniques may facilitate the use of wireless ranging and, thus, a variety of applications. Notably, when the determined range is within a threshold distance, the electronic device may perform an action. For example, the electronic device may: unlock the electronic device (or enable access to the electronic device, function(s), feature(s), etc.), transition the electronic device from a first power state to a second power state (such as from a low power state to a higher power state), or change a state of the electronic device (such as unlocking or opening a portal or door that is proximate or adjacent to the second electronic device). The action may be any action or actions implementable by the electronic device. Consequently, the measurement techniques may allow the electronic device to perform accurate range determination even in the presence of a dynamically changing environment and, thus, may facilitate more reliable applications that use the determined range. These capabilities may improve the user experience and customer satisfaction.

In the discussion that follows, the electronic device may communicate the wireless signals and may perform the measurements of the wireless signals in one or more bands of frequencies. For example, the wireless signals may have one or more carrier or fundamental frequencies between 3.1-10.6 GHz. Notably, the wireless signals may be compatible include or may use UWB or 'pulse radio', and/or may be compatible with an IEEE 802.15 standard (such as IEEE 802.15.4). More generally, the wireless signals may have one or more carrier or fundamental frequencies between 300 MHz and 100 GHz and a bandwidth of at least 500 MHz or 20% of the carrier frequency. In some embodiments, the wireless signals included pulses. By using pulses with wide bandwidths (such as greater than or equal to 500 MHz), the uncertainty of the pulse timing ($\Delta t$) may be small enough to allow precise determination or estimate of range, such as a range resolution of less than a few centimeters (e.g., an accuracy on the order of a millimeter). In some embodiments, the range resolution may be between 100 μm and 10 cm. In other embodiments, one or more other frequency ranges, bandwidths, protocols, and/or other wireless characteristics may be implemented.

Note that the measurement techniques in the following discussion may be used in conjunction with one or more other wireless ranging or location techniques in accordance with a communication protocol, such as a communication protocol that is compatible with an IEEE 802.11 standard (which is sometimes referred to as Wi-Fi). In some embodiments, the measurement techniques are used with IEEE 802.11BA and/or IEEE 802.11ax. However, the measurement techniques may also be used with a wide variety of other communication protocols, and in electronic devices (such as portable electronic devices or mobile devices) that can incorporate multiple different radio access technologies (RATs) to provide connections through different wireless networks that offer different location-based services and/or capabilities.

Therefore, the electronic device can include hardware and software to support a wireless personal area network (WPAN) according to a WPAN communication protocol, such as those standardized by the Bluetooth Special Interest Group (in Kirkland, Wash.) or other companies. Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point.

Additionally, it should be understood that, in some embodiments, the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1A presents a block diagram illustrating an example of communication between electronic device 110-1 and electronic device 112 (such as a smartphone or a wearable device, e.g., a smartwatch). Notably, electronic device 110-1 (such as vehicle, e.g., a car, a truck, an SUV, a motorcycle and, more generally, a vehicle that has wheels in contact with the ground; a computer, e.g., a laptop, a notebook computer, a tablet or another type of electronic device; a portal, e.g., a door, a window, a gate, a trunk, etc.) may include one or more instances of a physical responder 114. A physical responder (such as physical responder 114) may include an RF transceiver (such as RF transceiver 116-1, which may include at least one transmitter and at least one receiver, or a reconfigurable transmitter/receiver) and one or more antennas (such as antennas 118). Moreover, electronic device 110-1 may include an integrated circuit 120 (such as a processor or a control circuit) that is coupled to the one or more physical responders 114, e.g., by wired and/or wireless links or connections.

As described further below with reference to FIGS. 2 and 3, during operation integrated circuit 120 may configure two or more virtual responders (which are sometimes referred to as 'logical responders') associated with different subsets of capabilities of the one or more physical responders 114. Notably, a given virtual responder may corresponds to an RF transceiver (such as RF transceiver 116-1) and a given antenna in the multiple antennas 118. Note that the two or more virtual responders may correspond to the same or different RF transceivers. Therefore, there may be multiple virtual responders configured for a given RF transceiver and/or for different RF transceivers. Moreover, note that a given virtual responder may, at least in part, spatially overlap one or more other virtual responders (e.g., two of the virtual responders may each include a common antenna at a location on electronic device 110-1).

For example, a first physical responder may include a first RF transceiver and a first antenna, a second physical responder may include a second RF transceiver and a second antenna, and a virtual responder may include either the first RF transceiver and the first antenna, and the second RF transceiver and the second antenna. Alternatively, a first physical responder may include a first RF transceiver and a first antenna and a second antenna. A first virtual responder may include the first RF transceiver and the first antenna, and a second virtual responder may include the first RF transceiver and the second antenna. These implementations are illustrative and other implementations of a virtual responder may be create using different physical components.

Electronic device 110-1 may communicate using wireless communication (such as UWB) with electronic device 112 using one or more of physical responders 114 and/or one or more of the virtual responders. Notably, the one or more of physical responders 114 and/or the one or more of the virtual responders may perform measurements on wireless signals 122 associated with electronic device 112 and intended for electronic device 110-1 (e.g., wireless signals 122, represented by a jagged line, transmitted by a radio 124 in electronic device 112 to electronic device 110-1). These measurements may indicate, may correspond to, and/or may specify a time of flight of wireless signals 122 from electronic device 112 to electronic device 110-1. Next, based at least in part on the measurements, integrated circuit 120 may determine a range between electronic devices 110-1 and 112, where the determination uses the measurements from the one or more of physical responders 114 and/or the one or more of the virtual responders to correct for an environmental condition and/or increase an accuracy of the determined range.

For example, the environmental condition may include interference and/or a multipath signal. The measurements may estimate and/or correct for the environmental condition using physical responders and/or virtual responders at or associated with different locations on electronic device 110-1, such as antennas at different locations on electronic device 110-1. Alternatively, the measurements may estimate and/or correct for the environmental condition using physical responders and/or virtual responders at or associated with a same or common location on electronic device 110-1, such as measurements performed with an antenna at different times (which, e.g., may be average or used to identify and exclude outlier measurements). Notably, in some embodiments, at least a subset of the virtual responders may perform measurements of wireless signals (which may include transmitting and receiving wireless signals) two or more times, and the multiple measurements from a given virtual responder may be subsequently averaged. Thus, the measurement techniques may use spatial and/or temporal diversity. These capabilities may allow performance to be verified, to improve accuracy of localization and/or to improve security or to detect attacks (such as man in the middle, spoofing, etc.).

When the determined range is within a threshold distance (such as when electronic device 112 is an arm's-length of or less than 1 m from a door to a car), integrated circuit 120 may perform an action. For example, integrated circuit 120 may: unlock electronic device 110-1, transition electronic device 110-1 from a first power state to a second power state (such as from a low power state to a higher power state), change a state of electronic device 110-1 (such as unlocking or opening a portal or door that is proximate or adjacent to electronic device 112) or identify electronic device 112.

In some embodiments, the measurements from the one or more of physical responders 114 and/or the one or more of the virtual responders may be used to estimate a direction or angle of approach of electronic device 112 towards electronic device 110-1. Using this information, integrated circuit 120 may identify an appropriate portal or door to open or unlock. For example, a user of electronic device 112 may approach a car that has four doors (two driver's-side doors, two passenger doors) and a trunk. The car may include physical responders located on or proximate to each of the two driver's-side doors, the two passenger doors, the front bumper, the rear bumper and/or inside of the car (to determine whether electronic device 112, and thus the user, is inside or outside of the car). Two or more of the virtual responders and/or the physical responders may provide multiple range measurements. Based at least in part on the range measurements (e.g., proximity of electronic device 112) and the angle of approach determined from the measurements, integrated circuit 120 may open the car trunk.

Because the environmental condition may change as a function of time, in some embodiments integrated circuit 120 may dynamically configure the virtual responders. For example, integrated circuit 120 may dynamically configure the virtual responders based at least in part on one or more communication performance metrics associated with the wireless communication.

In some embodiments, the range is determined by integrated circuit 120 based at least in part in a second time of flight of second wireless signals associated with electronic device 110-1 and intended for electronic device 112 (e.g., the second wireless signals transmitted by one or more of the RF transceivers in electronic device 110-1 to electronic device 112). For example, radio 124 may measure the second wireless signals, may determine the second time of flight, and may communicate this information to electronic device 110-1 in one or more packets or frames. Thus, in some embodiments, the range is determined based on unilateral (or unidirectional) or bilateral (or bidirectional) communication between electronic devices 110-1 and 112.

In some embodiments, the one or more RF transceivers may have static or dynamic fields of view (such as an angular range that is greater than 90° and less than 180°) and the fields of view of adjacent RF transceivers may at least partially overlap. Thus, the given RF transceiver may have a directional antenna pattern that is other than or different from an omnidirectional antenna pattern. The one or more RF transceivers may provide 360° coverage around electronic device 110-1 at least in a horizontal plane.

Moreover, based at least in part on instructions or signals from integrated circuit 120, at least one of the one or more physical responders or the one or more virtual responders may transmit wireless signals 122. Thus, integrated circuit 120 may coordinate the transmissions from the one or more physical responders or the one or more virtual responders to void mutual interference.

While the preceding discussion illustrated the measurement techniques using pulses, in other embodiments (e.g., frequency-modulated) continuous-wave signals (such as chirp or pulse-compressed signals) may be used, and the range may be determined from the amplitude modulation, frequency modulation and/or phase modulation of reflected signals. Moreover, operations in the measurement techniques (such as the filtering) may be performed in the time and/or frequency domain, and may be implemented using analog or digital techniques.

In some embodiments, electronic devices 110-1 and 112 may communicate wirelessly, e.g., in a WLAN using an IEEE 802.11 communication protocol. Thus, electronic devices 110-1 and 112 may be associated with each other. For example, electronic devices 110-1 and 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). In these embodiments, electronic device 110-1 may be or may provide the functions of an access point that facilitates access to a network, such as the Internet, via an Ethernet protocol, and may be a physical access point or a virtual or 'software' access point that is implemented on a computer or an electronic device. However, in some embodiments, electronic devices 110-1 and/or 112 may communicate with a base station in a cellular-telephone network, e.g., using a cellular-telephone communication protocol.

Figure 4:
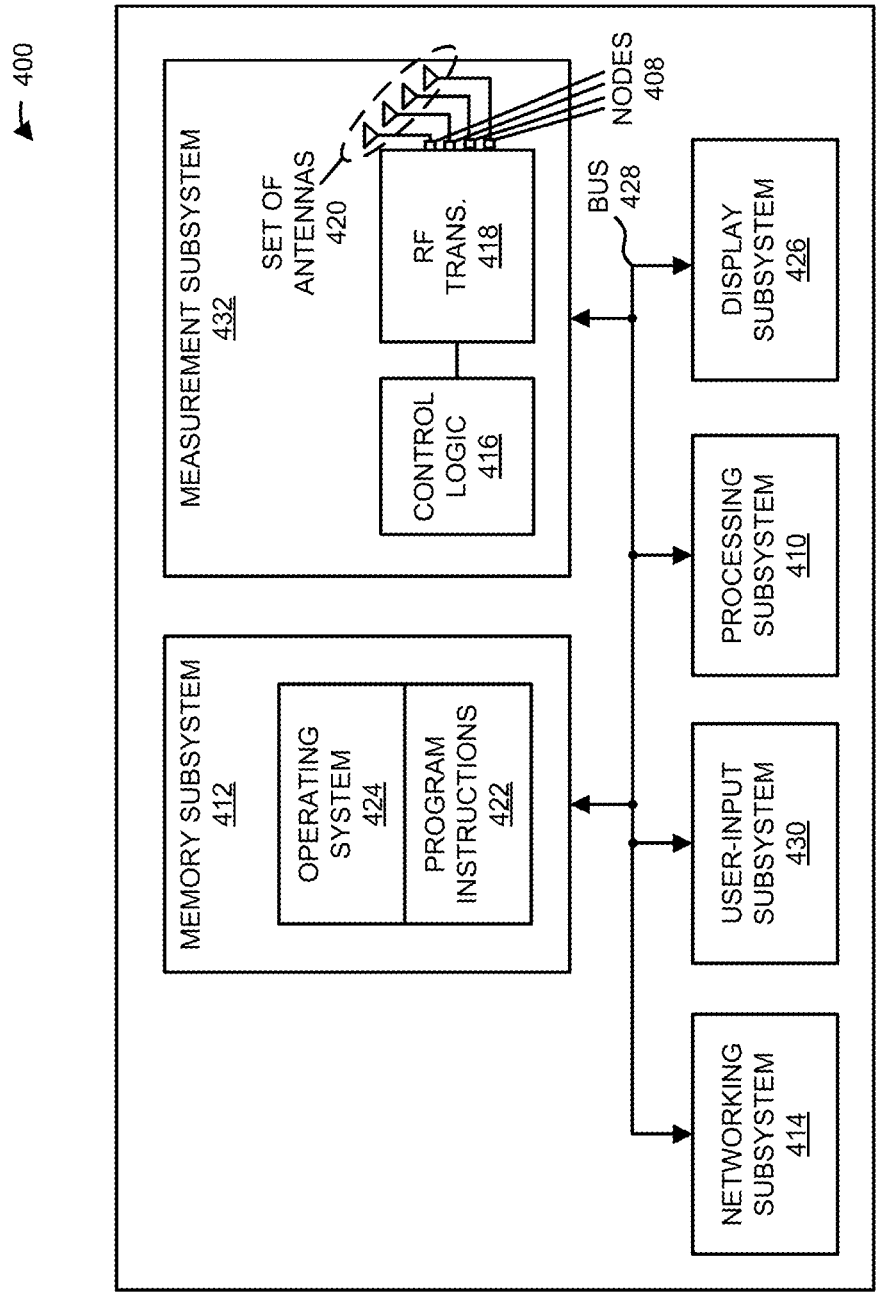
FIG. 4 is a block diagram illustrating an example of an electronic device of FIG. 1A.

As described further below with reference to FIG. 4, electronic device 110-1 and/or electronic device 112 may include subsystems, such as a networking subsystem, a memory subsystem, a processor subsystem, a measurement subsystem and an analysis subsystem. In general, electronic device 110-1 may include any electronic device with a measurement subsystem that enables electronic device 110-1 to perform measurements (such as wireless measurements), and an analysis subsystem that determines the range. In addition, electronic device 110-1 and/or electronic device 112 may include RF transceivers and/or radios in the networking subsystems. In some embodiments, electronic device 110-1 and electronic device 112 can include (or can be included within) any electronic devices with networking subsystems that enable electronic device 110-1 and electronic device 112, respectively, to wirelessly communicate with another electronic device. This can include transmitting pulses for use in the measurement techniques. Alternatively or additionally, this can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

Note that electronic device 110-1 and/or electronic device 112 may be compatible with an IEEE 802.11 standard that includes trigger-based channel access (such as IEEE 802.11ax). However, electronic device 110-1 and/or electronic device 112 may also communicate with one or more legacy electronic devices that are not compatible with the IEEE 802.11 standard (i.e., that do not use multi-user trigger-based channel access). In some embodiments, electronic device 110-1 uses multi-user transmission (such as orthogonal frequency division multiple access or OFDMA). For example, a radio in electronic device 110-1 (such as radio 126) may provide a trigger frame for one or more electronic devices. Moreover, after radio 124 receives a trigger frame, radio 124 may provide a group acknowledgment to radio 126. For example, radio 124 may provide the acknowledgment during an assigned time slot and/or in an assigned channel in the group acknowledgment. However, in some embodiments the one or more electronic devices may individually provide acknowledgments to radio 126. Thus, after radio 124 receives the trigger frame, radios (such as radio 124) in the one or more electronic devices) may provide an acknowledgment to radio 126.

In the described embodiments, processing a packet or frame in electronic device 110-1 and electronic device 112 includes: receiving wireless signals encoding a packet or a frame; decoding/extracting the packet or frame from received wireless signals to acquire the packet or frame; and processing the packet or frame to determine information contained in the packet or frame (such as data in the payload).

In general, the communication via pulses, a WLAN and/or a cellular-telephone network in the measurement techniques may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1A as an example, in alternative embodiments, different numbers and/or types of electronic devices may be present. For example, some embodiments may include more or fewer electronic devices. As another example, in other embodiments, different electronic devices can be transmitting and/or receiving packets or frames. In some embodiments, different electronic devices may be transmitting and/or receiving wireless signals.

Figure 1B:
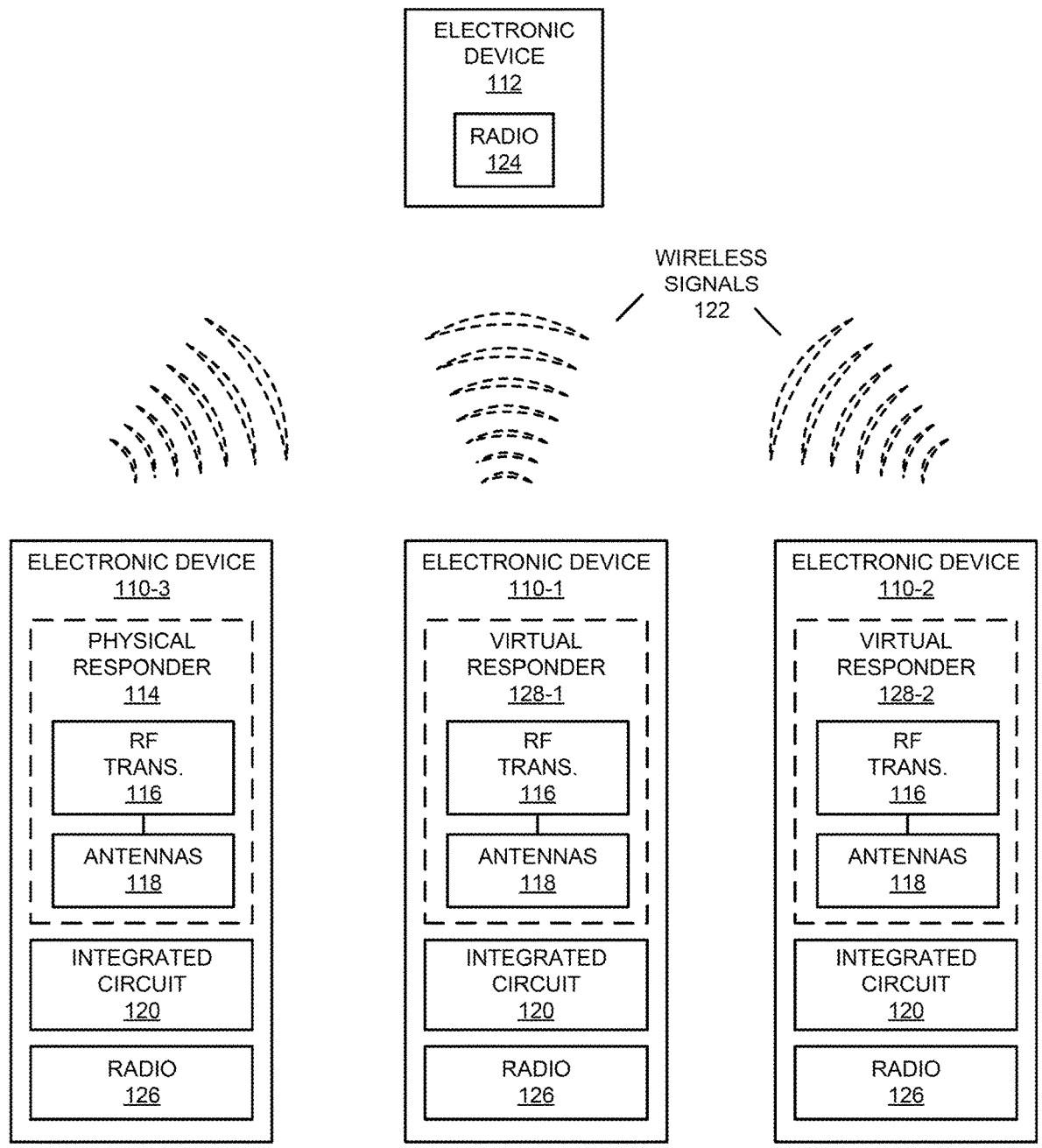
FIGS. 1B and 1C are block diagrams illustrating example embodiments of electronic devices.

FIG. 1B illustrates multiple examples of the electronic devices 110. A first example of the electronic device 110-1 includes a virtual responder 128-1. A second example of the electronic device 110-2 includes a virtual responder 128-2. As illustrated, the virtual responder 128-1 and the virtual responder 128-2 correspond to the same hardware.

Figure 1C:
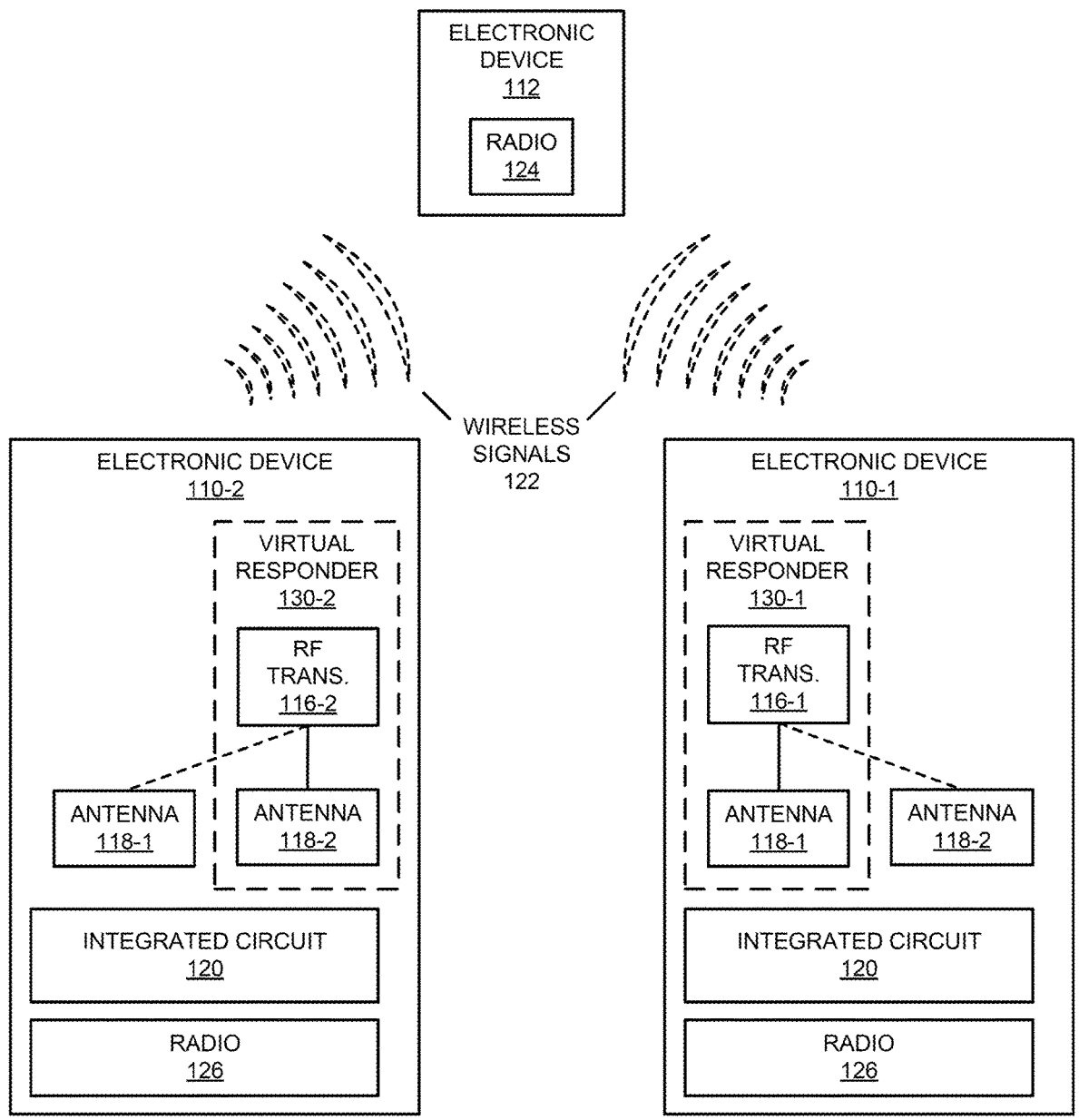

FIG. 1C illustrates additional examples of the electronic devices 110. A first example of the electronic device 110-1 includes a virtual responder 130-1, which includes the RF transceiver 116-1 and a first antenna 118-1, but excludes a second antenna 118-2 (as indicated by the dashed line in electronic device 110-1 in FIG. 1C). A second example of the electronic device 110-2 includes a virtual responder 130-2, which includes the RF transceiver 116-2 and the second antenna 118-2, but excludes the first antenna 118-1 (as indicated by the dashed line in electronic device 110-2 in FIG. 1C). For example, an RF transceiver in a given electronic device may be selectively attached or coupled to a given antenna having a given polarization, and a virtual responder may include or select a particular antenna having a particular polarization (such as one of two antennas 118 having different polarizations). Alternatively, an RF transceiver in a given electronic device may be selectively attached or coupled to a given antenna in two or more antennas, and the antennas (such as antennas 118) may have the same polarization.

Although these examples are illustrated, other examples and arrangements are also envisioned, encompassing the full scope of variation discussed herein.

Figure 2:
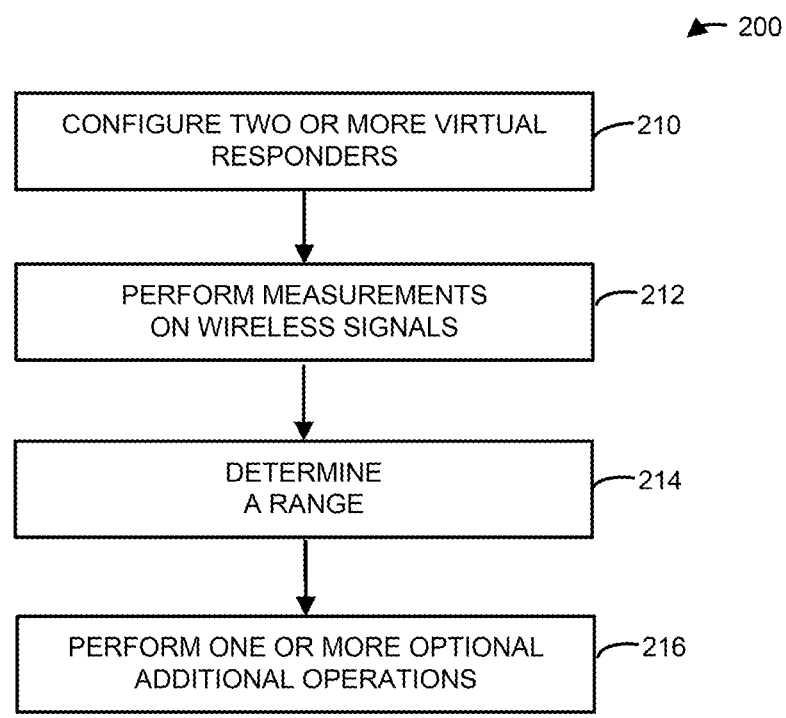
FIG. 2 is a flow diagram illustrating an example method for determining a range using an electronic device of FIG. 1A.

FIG. 2 presents a flow diagram illustrating an example method 200 for determining a range. This method may be performed by an electronic device, such as electronic device 110-1 in FIG. 1A. During operation, the electronic device may configure two or more virtual responders (operation 210) associated with different subsets of capabilities of a physical responder in the electronic device, where the physical responder comprises an RF transceiver and multiple antennas, and where a given virtual responder corresponds to the RF transceiver and a given antenna in the multiple antennas. Then, the electronic device may perform, based at least in part on wireless communication with a second electronic device and using at least the virtual responders, measurements on wireless signals (operation 212) associated with the second electronic device and intended for the electronic device, where the measurements correspond to a time of flight of the wireless signals. Next, the electronic device may determine, based at least in part on the measurements, the range (operation 214) between the electronic device and the second electronic device. Further, the determination can use the measurements from different virtual responders to correct for an environmental condition (such as interference from an interference source, a reflection, transient variation in the received signal strength and/or a multipath signal) and/or increase an accuracy of the determined range.

In some embodiments, the electronic device performs one or more optional additional operations (operation 216). For example, when the determined range is within a threshold distance, the electronic device may perform an action. Notably, the electronic device may: unlock the electronic device, enable a function, feature, or application of the electronic device, transition the electronic device from a first power state to a second power state (such as from a low power state to a higher power state), change a state of the electronic device (such as unlocking or opening a portal or door that is proximate or adjacent to the second electronic device) or identify the second electronic device.

Note that at least the virtual responders may perform the measurements at different spatial locations on the electronic device and/or at different times at a same location on the electronic device (such as using the same antenna in the multiple antennas). Furthermore, at least some of the measurements may also be performed by the physical responder. Thus, the measurements may use spatial and/or temporal diversity.

Additionally, the electronic device may include at least a second physical responder with a second RF transceiver and multiple second antennas, and the electronic device may configure two or more second virtual responders associated with different subsets of capabilities of the second physical responder. In these embodiments, the measurements may be performed by the physical responder, the second physical responder, the virtual responders and/or the second virtual responders.

In some embodiments, the electronic device dynamically configures the virtual responders. For example, the virtual responders may be dynamically configured based at least in part on one or more of: a changing environmental condition, a change in the location of the electronic device, a time of day, etc.

Note that the environmental condition may include interference from an interference source, a reflection, and/or a multipath signal.

Moreover, the range may be determined based at least in part in a second time of flight of second wireless signals associated with the electronic device and intended for the second electronic device (e.g., the second wireless signals from the electronic device to the second electronic device).

In some embodiments of method 200 (FIG. 2), there may be additional or fewer operations. Further, one or more different operations may be included. Moreover, the order of the operations may be changed, and/or two or more operations may be combined into a single operation or performed at least partially in parallel.

Figure 3:
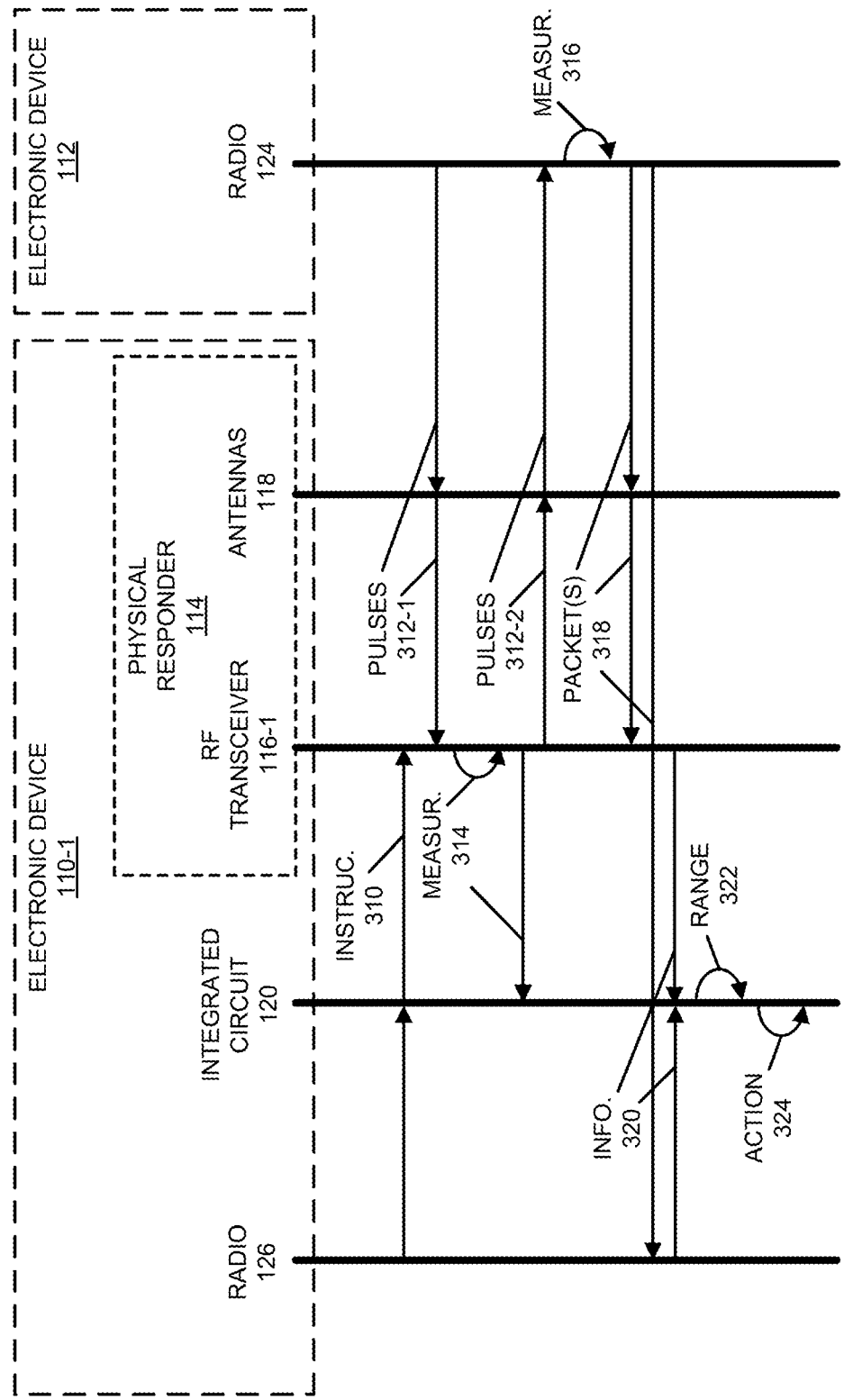
FIG. 3 is a flow diagram illustrating an example of communication among components in the electronic devices of FIG. 1A.

The measurements techniques are further illustrated in FIG. 3, which presents a flow diagram illustrating an example of communication among components in electronic devices 110-1 and 112. During operation, integrated circuit 120 in electronic device 110-1 may configure two or more virtual responders associated with different subsets of capabilities of a physical responder 114 in electronic device 110-1, where physical responder 114 includes RF transceiver 116-1 and multiple antennas 118, and where a given virtual responder corresponds to RF transceiver 116-1 and a given antenna in the multiple antennas. Notably, integrated circuit 120 may provide instructions 310 or signals to physical responder 114 (such as to RF transceiver 116-1) to configure the two or more virtual responders.

Then, physical responder 114 and/or the two or more virtual responders may wirelessly communicate pulses 312 with radio 124 in electronic device 112. For example, radio 124 may transmit pulses 312-1 to electronic device 110, which are measured 314 by physical responder 114 and/or the two or more virtual responders. These measurements may correspond to a time of flight of pulses 312-1. For example, pulses 312-1 may be time stamped with a transmit time when transmitted by radio 124, and may be time stamped with a receive time when received by physical responder 114 and/or the two or more virtual responders. Next, physical responder 114 may provide the measurements 314 to integrated circuit 120.

In some embodiments, physical responder 114 and/or the two or more virtual responders may transmit pulses 312-2 to electronic device 110, which are measured 316 by radio 124. These measurements may correspond to or otherwise indicate a time of flight of pulses 312-2. For example, pulses 312-2 may be time stamped with a transmit time(s) when transmitted by physical responder 114 and/or the two or more virtual responders, and may be time stamped with a receive time when received by radio 124. Then, radio 124 may transmit one or more packets 318 or frames with information 320 that specifies the time of flight of pulses 312-2 to electronic device 110. After receiving the one or more packets 318 or frames, physical responder 114 and/or radio 126 may provide the information 320 to integrated circuit 120.

Next, integrated circuit 120 may determine, based at least in part on the measurements 314 and/or the information 320, range 322 between electronic devices 110-1 and 112, where the determination uses the measurements from different virtual responders to correct for an environmental condition (such as interference, a reflection and/or a multipath signal) and/or increase an accuracy of the determined range 322.

In some embodiments, integrated circuit 120 performs an optional action 324. For example, when the determined range 322 is within a threshold distance, integrated circuit 120 may perform action 324.

While communication between the components in FIG. 3 is illustrated with unilateral or bilateral communication (e.g., lines having a single arrow or dual arrows), in general a given communication operation may be unilateral or bilateral.

In summary, the measurement techniques may allow dynamic, reliable and accurate determination of the range between the electronic device and the second electronic device. Moreover, this capability may enable a wide variety of location or proximity-based applications. Consequently, the measurement techniques may improve the user experience when using the electronic device.

As described herein, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 4 presents a block diagram of an electronic device 400 (which may be a cellular telephone, a smartwatch, an access point, a wireless speaker, an IoT device, another electronic device, etc.) in accordance with some embodiments. This electronic device includes processing subsystem 410, memory subsystem 412, networking subsystem 414 and measurement subsystem 432. Processing subsystem 410 includes one or more devices configured to perform computational operations. For example, processing subsystem 410 can include one or more microprocessors, application-specific integrated circuits (ASICs), microcontrollers, graphics processing units (GPUs), programmable-logic devices, and/or one or more digital signal processors (DSPs).

Memory subsystem 412 includes one or more devices for storing data and/or instructions for processing subsystem 410, networking subsystem 414 and/or measurement subsystem 432. For example, memory subsystem 412 can include dynamic random access memory (DRAM), static random access memory (SRAM), a read-only memory (ROM), flash memory, and/or other types of memory. In some embodiments, instructions for processing subsystem 410 in memory subsystem 412 include: program instructions or sets of instructions (such as program instructions 422 or operating system 424), which may be executed by processing subsystem 410. For example, a ROM can store programs, utilities or processes to be executed in a non-volatile manner, and DRAM can provide volatile data storage, and may store instructions related to the operation of electronic device 400. Note that the one or more computer programs may constitute a computer-program mechanism, a computer-readable storage medium or software. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 410. In some embodiments, the one or more computer programs are distributed over a network-coupled computer system so that the one or more computer programs are stored and executed in a distributed manner.

In addition, memory subsystem 412 can include mechanisms for controlling access to the memory. In some embodiments, memory subsystem 412 includes a memory hierarchy that comprises one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data.

Networking subsystem 414 includes one or more devices configured to couple to and communicate on a wired and/or wireless network (i.e., to perform network operations), such as: control logic, an interface circuit and a set of antennas (or antenna elements) in an adaptive array that can be selectively turned on and/or off by control logic to create a variety of optional antenna patterns or 'beam patterns.' Alternatively, instead of the set of antennas, in some embodiments electronic device 400 includes one or more nodes, e.g., a pad, which can be coupled to the set of antennas. Thus, electronic device 400 may or may not include the set of antennas. For example, networking subsystem 414 can include a Bluetooth networking system, a cellular networking system (e.g., a 3G/4G/5G network such as UMTS, LTE, etc.), a universal serial bus (USB) networking system, a networking system based on the standards described in IEEE 802.12 (e.g., a WiFi® networking system), an Ethernet networking system, and/or another networking system.

Networking subsystem 414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 400 may use the mechanisms in networking subsystem 414 for performing simple wireless communication between the electronic devices, e.g., transmitting advertising or frame frames and/or scanning for advertising frames transmitted by other electronic devices.

Measurement subsystem 432 includes one or more devices configured to transmit wireless (e.g., radar) signals and to perform wireless measurements, such as: control logic 416, multiple independent RF transceivers 418 that are collocated in electronic device 400, and a set of one or more antennas 420 (or antenna elements) that are electrically coupled to RF transceivers 418 at nodes 408 (such as, e.g., one or more pads). These independent RF transceivers may not be synchronized with each other. In some embodiments, set of antennas 420 have a directional antenna pattern that is other than or different from an omnidirectional antenna pattern.

Within electronic device 400, processing subsystem 410, memory subsystem 412, networking subsystem 414 and measurement subsystem 432 are coupled together using bus 428 that facilitates data transfer between these components. Bus 428 may include an electrical, optical, and/or electro-optical connection that the subsystems can use to communicate commands and data among one another. Although only one bus 428 is shown for clarity, different embodiments can include a different number or configuration of electrical, optical, and/or electro-optical connections among the subsystems.

In some embodiments, electronic device 400 includes a display subsystem 426 for displaying information on a display, which may include a display driver and the display, such as a liquid-crystal display, a multi-touch touchscreen, etc. Display subsystem 426 may be controlled by processing subsystem 410 to display information to a user (e.g., information relating to incoming, outgoing, or an active communication session).

Electronic device 400 can also include a user-input subsystem 430 that allows a user of the electronic device 400 to interact with electronic device 400. For example, user-input subsystem 430 can take a variety of forms, such as: a button, keypad, dial, touch screen, audio input interface, visual/image capture input interface, input in the form of sensor data, etc.

Electronic device 400 can be (or can be included in) any electronic device with at least one network interface or a measurement subsystem. For example, electronic device 400 may include: a cellular telephone or a smartphone, a tablet computer, a laptop computer, a notebook computer, a personal or desktop computer, a netbook computer, a media player device, a wireless speaker, an IoT device, an electronic book device, a MiFi® device, a smartwatch, a wearable computing device, a portable computing device, a consumer-electronic device, a vehicle, a door, a window, a portal, an access point, a router, a switch, communication equipment, test equipment, as well as any other type of electronic computing device having wireless communication capability that can include communication via one or more wireless communication protocols.

Although specific components are used to describe electronic device 400, in alternative embodiments, different components and/or subsystems may be present in electronic device 400. For example, electronic device 400 may include one or more additional processing subsystems, memory subsystems, networking subsystems, and/or display subsystems. Additionally, one or more of the subsystems may not be present in electronic device 400. Moreover, in some embodiments, electronic device 400 may include one or more additional subsystems that are not shown in FIG. 4. In some embodiments, electronic device may include an analysis subsystem that performs at least some of the operations in the measurement techniques. Also, although separate subsystems are shown in FIG. 4, in some embodiments some or all of a given subsystem or component can be integrated into one or more of the other subsystems or component(s) in electronic device 400. For example, in some embodiments program instructions 422 are included in operating system 424 and/or control logic 416 is included in RF transceivers 418.

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 414. This integrated circuit may include hardware and/or software mechanisms that are used for transmitting wireless signals from electronic device 400 and receiving signals at electronic device 400 from other electronic devices. Aside from the mechanisms herein described, radios are generally known in the art and hence are not described in detail. In general, networking subsystem 414 and/or the integrated circuit can include any number of radios. Note that the radios in multiple-radio embodiments function in a similar way to the described single-radio embodiments.

In some embodiments, networking subsystem 414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

Alternatively or additionally, an integrated circuit (which is sometimes referred to as a 'measurement circuit') may implement some or all of the functionality of measurement subsystem 432. This integrated circuit may include hardware and/or software mechanisms that are used for transmitting wireless signals from electronic device 400 and receiving wireless signals at electronic device 400.

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a UWB communication protocol as an illustrative example, in other embodiments a wide variety of communication protocols and, more generally, wireless communication techniques may be used. Thus, the measurement techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the measurement techniques may be implemented using program instructions 422, operating system 424 (such as a driver for an interface circuit in networking subsystem 414 or RF transceivers 418 in measurement subsystem 432) or in firmware in an interface circuit networking subsystem 414 or in measurement subsystem 432. Alternatively or additionally, at least some of the operations in the measurement techniques may be implemented in a physical layer, such as hardware in an interface circuit in networking subsystem 414 or in measurement subsystem 432. In some embodiments, the measurement techniques are implemented, at least in part, in a MAC layer and/or in a physical layer in an interface circuit in networking subsystem 414.

While examples of numerical values are provided in the preceding discussion, in other embodiments different numerical values are used. Consequently, the numerical values provided are not intended to be limiting.

Moreover, while the preceding embodiments illustrated the use of wireless signals in one or more bands of frequencies, in other embodiments of the measurement techniques electromagnetic signals in one or more different frequency bands are used to determine the range. For example, these signals may be communicated in one or more bands of frequencies, including: a microwave frequency band, a radar frequency band, 900 MHz, 2.4 GHz, 5 GHz, 60 GHz, and/or a band of frequencies used by a Citizens Broadband Radio Service or by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising:
control logic configured to:
provide instructions or electrical signals to a physical responder to configure two or more virtual responders with different subsets of capabilities of the physical responder, wherein the physical responder comprises:
a radio-frequency (RF) transceiver configured to receive wireless signals; and
multiple antennas;
wherein a given virtual responder corresponds to the RF transceiver and a given antenna in the multiple antennas, and
wherein a field of view of the given virtual responder at least partially overlaps a second field of view of another of the two or more virtual responders.

2. The integrated circuit of claim 1, wherein the control logic is configured to:
perform, based at least in part on wireless communication with a second electronic device and using at least the virtual responders, measurements on the wireless signals associated with the second electronic device and intended for the electronic device, wherein the measurements correspond to a time of flight of the wireless signals; and
determine, based at least in part on the measurements, a range between the electronic device and the second electronic device, wherein the determination uses the measurements from different virtual responders.

3. The integrated circuit of claim 2, wherein the determination corrects for an environmental condition, increases an accuracy of the determined range, or both.

4. An electronic device, comprising:
a physical responder, comprising:
a radio-frequency (RF) transceiver configured to receive wireless signals; and
multiple antennas; and
an integrated circuit coupled to the physical responder, wherein the electronic device is configured to:
configure two or more virtual responders associated with different subsets of capabilities of the physical responder, wherein a given virtual responder corresponds to the RF transceiver and a given antenna in the multiple antennas, and
wherein a field of view of the given virtual responder overlaps at least a portion of a second field of view of another of the two or more virtual responders.

5. The electronic device of claim 4, wherein the electronic device is configured to:
perform, based at least in part on wireless communication with a second electronic device and using at least the virtual responders, measurements on the wireless signals associated with the second electronic device and intended for the electronic device, wherein the measurements correspond to a time of flight of the wireless signals; and
determine, based at least in part on the measurements, a range between the electronic device and the second electronic device, wherein the determination uses the measurements from different virtual responders.

6. The electronic device of claim 5, wherein, when the determined range is within a threshold distance, the integrated circuit performs an action.

7. The electronic device of claim 6, wherein the action comprises: unlocking the electronic device, transitioning the electronic device from a first power state to a second power state, or changing a state of the electronic device.

8. The electronic device of claim 5, wherein at least the virtual responders perform the measurements at different spatial locations on the electronic device, at different times at a same location on the electronic device, or both.

9. The electronic device of claim 5, wherein the measurements are also performed by the physical responder.

10. The electronic device of claim 5, wherein the determination corrects for an environmental condition, increases an accuracy of the determined range or both.

11. The electronic device of claim 10, wherein the environmental condition comprises interference or a multipath signal.

12. The electronic device of claim 5, wherein the second electronic device comprises a cellular telephone.

13. The electronic device of claim 5, wherein the RF transceiver is configured to transmit second wireless signals; and
wherein the range is determined based at least in part in a second time of flight of the second wireless signals associated with the electronic device and intended for the second electronic device.

14. The electronic device of claim 4, wherein the electronic device comprises:
a second physical responder, comprising:
a second RF transceiver; and
multiple second antennas; and
wherein the integrated circuit is configured to configure two or more second virtual responders associated with different subsets of capabilities of the second physical responder.

15. The electronic device of claim 14, wherein the electronic device is configured to:
perform, based at least in part on wireless communication with a second electronic device and using at least the virtual responders, measurements on the wireless signals associated with the second electronic device and intended for the electronic device, wherein the measurements correspond to a time of flight of the wireless signals; and
determine, based at least in part on the measurements, a range between the electronic device and the second electronic device, wherein the determination uses the measurements from different virtual responders; and
wherein the measurements are performed by two or more of: the physical responder, the second physical responder, the virtual responders, or the second virtual responders.

16. The electronic device of claim 4, wherein the integrated circuit dynamically configures the virtual responders.

17. The electronic device of claim 4, wherein wireless communication of the wireless signals uses ultra-wideband (UWB).

18. The electronic device of claim 4, wherein the two or more virtual responders comprise a first virtual responding and a second virtual responder; and
wherein the first virtual responder comprises a first antenna in the multiple antennas having a polarization and the second virtual responder comprises a second antenna in the multiple antennas having the polarization.

19. A method for determining a range, comprising:
by an electronic device:
configuring two or more virtual responders associated with different subsets of capabilities of a physical responder in the electronic device, wherein the physical responder comprises a radio-frequency (RF) transceiver and multiple antennas, wherein a given virtual responder corresponds to the RF transceiver and a given antenna in the multiple antennas, and wherein a field of view of the given virtual responder overlaps at least a portion of a second field of view of another of the two or more virtual responders;
performing, based at least in part on wireless communication with a second electronic device and using at least the virtual responders, measurements on wireless signals associated with the second electronic device and intended for the electronic device, wherein the measurements correspond to a time of flight of the wireless signals; and
determining, based at least in part on the measurements, the range between the electronic device and the second electronic device, wherein the determination uses the measurements from different virtual responders.

20. The method of claim 19, wherein the determination corrects for an environmental condition, increases an accuracy of the determined range, or both.

* * * * *